Patented Jan. 13, 1925.

1,523,179

UNITED STATES PATENT OFFICE.

ARILLE DE GALLAIX, OF PITTSBURGH, PENNSYLVANIA.

VITRIFIED PRODUCT AND PROCESS OF MAKING SAME.

No Drawing.     Application filed June 24, 1924. Serial No. 722,147.

*To all whom it may concern:*

Be it known that I, ARILLE DE GALLAIX, a subject of the King of Belgium, having declared my intentions of becoming a citizen of the United States, residing at Pittsburgh, in the county of Allegheny and State of Pennsylvania, have invented new and useful Improvements in Vitrified Products and Processes of Making Same, of which the following is a specification.

The present invention relates to the production of ceramic products, in a vitrified condition, as face bricks, fine and common floor tiles, paving tiles and other articles for building and paving purposes in general.

The invention embraces the use, in the manufacture of the above products of three separate materials, as follows: (a) plastic clay; (b) blast furnace slag and (c) grog, which latter material is composed of defective or broken bricks or tiles, made of the three materials above mentioned, which have been burned and subsequently reduced to a pulverized condition. The three materials referred to will hereinafter be mentioned shortly as "clay, slag and grog."

The slag from blast furnace has heretofore been proposed as an ingredient for making bricks, bonded with a suitable binding agent such as clay or the like and sometimes other components are used, for particular purposes, depending upon the use of the finished product. Such a mixture of clay and furnace slag has not given entire satisfaction, for the reason that the slag itself has practically no plasticity and after burning, the products are not sufficiently strong, and are not resistant to atmospheric conditions and to shock, so that they soon disintegrate, particularly when used for paving and even when used for building.

The prior workers in this art have also proposed making bricks or similar shaped articles out of a mixture of unburned clay and clay bricks, or other baked clay ware, but these products do not vitrify upon burning, are generally porous, and would not be, in any case, sufficiently strong for use as paving material, (i. e. paving blocks) and the like.

In accordance with the present invention, however, it is possible to obtain, by the use of clay, slag and grog and subsequent burning at a vitrifying temperature, bricks, tiles and other articles which are vitrified and which also hold their shape well during the burning and subsequent cooling operations, so as to produce ceramic products which are true to shape, that is to say, they do not warp during the firing operation and they are also able to withstand the effects of frost and changes of temperature without chipping or peeling and on account of the vitrification they are not porous. Such products are sufficiently hard and strong to be used in paving purpose and are found to produce very satisfactory results in such use, even when subjected to heavy wear.

In accordance with the present invention, the blast furnace slag, clay and the grog are first separately crushed and minced to powder, for example, under the wheels of a chaser mill, and are screened thereafter. These materials are mixed together in a pug mill or similar device and in varying amounts, depending on the properties desired in the final products.

For the production of one form of products, I may use 6 parts of plastic clay, 1 part of powdered grog, and 3 parts of powdered slag, whereas, in other cases, I may mix together 1 part of plastic clay, 1 part of powdered grog, 4 parts of powdered slag; various intermediate proportions could also be used. These materials, in each case, will be mixed with a sufficient amount of water to produce a rather stiff mud or motar, which thereafter can be molded into bricks or pressed into tiles and so on, in the usual manner and are thereafter dried and are burned in a kiln and at a high temperature sufficient to produce a vitrified texture. The temperature of the burning operation will depend to a considerable extent upon the proportions of slag, grog and clay, and with the first of the two specific examples mentioned, 6.1.3 mixture, I may use a temperature of about 1210° C. or 2210° Fahr., whereas with the second of the specifically described mixtures, namely, 1.1.4 mixture a temperature of about 1050° C. or 1922° Fahr. will be found satisfactory.

It is to be understood that in addition to the three materials above mentioned, suitable coloring material can be added in the form of powders, these being preferably added during the mixing operation, so that the final product—especially floor tiles—has the color not only on its surface, but all through the mass, which process enables the floor tile to last a great deal longer. In some cases, however, it may be advisable to sift the color upon the material as it goes into the mold, or to line the mold with a colored mixture, if it is desired, to produce only a colored surface coating of the mass.

The grog referred to above, as will be understood, consists of bricks or tiles of the vitrified variety as made in accordance with the present process, crushed up into a powdery state; these bricks are entirely different from ordinary clay bricks, which have heretofore been used in the manufacture of chamotte, or as an impoverishing agent in clay brick mixtures.

It will be understood that the drying operation, which is performed after the molding operation and before the burning operation, can be conducted in the usual manner, for instance, by placing the molded bricks and pressed tiles on cars or on pallets in a suitable tunnel drier and allowing the same to stand until sufficiently dry, which may require a few days, or longer, in case of larger or thicker products. Sufficient drying should be carried out to prevent the products from breaking up or forming cracks during the subsequent firing operation.

It will be also understood that the term "plastic clay" as used above and in the appended claims, is intended to include not only plastic clay but also plastic shale, which may be regarded as clay in the process of formation of the product.

I claim:

1. The herein described vitrified ceramic products composed essentially of powdered slag, powdered grog and plastic clay, the same being burned at a temperature high enough to vitrify the same throughout, such products being substantially impervious to water, oil and grease, and unaffected by frost and atmospheric conditions and being stable against shock.

2. A process of making highly vitrified ceramic products which comprises mixing together powdered slag, powdered clay and powdered grog formed from vitrified bricks or tiles, molding the same and drying and burning at a temperature high enough to produce substantial vitrification throughout the mass.

In testimony whereof I affix my signature.

ARILLE DE GALLAIX.